Jan. 8, 1963  C. R. HILPERT  3,071,922
TORQUE LIMITING DEVICE
Filed Dec. 14, 1959  7 Sheets-Sheet 1

Inventor
Conrad R. Hilpert
By John W. Darley
Attorney.

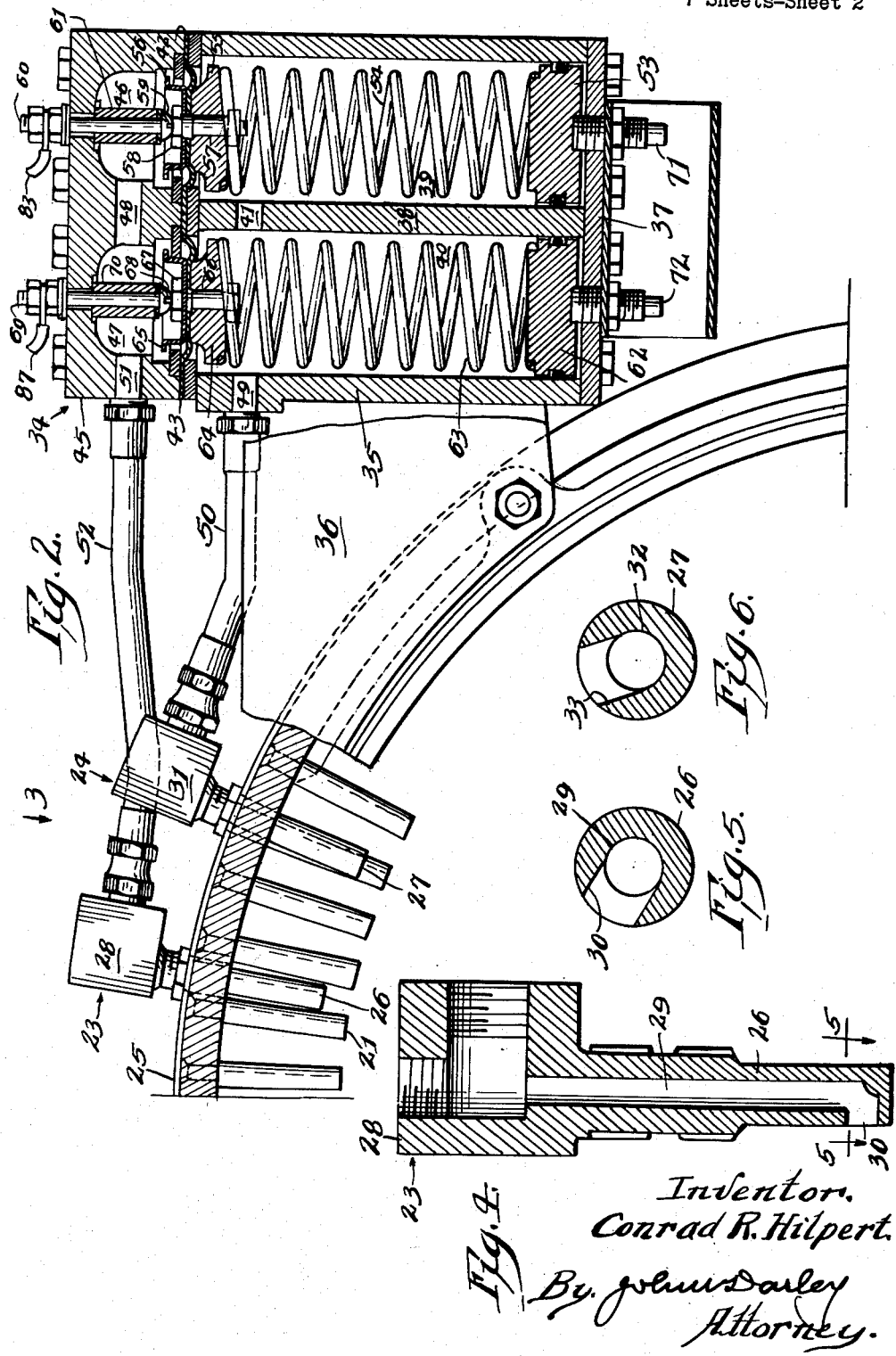

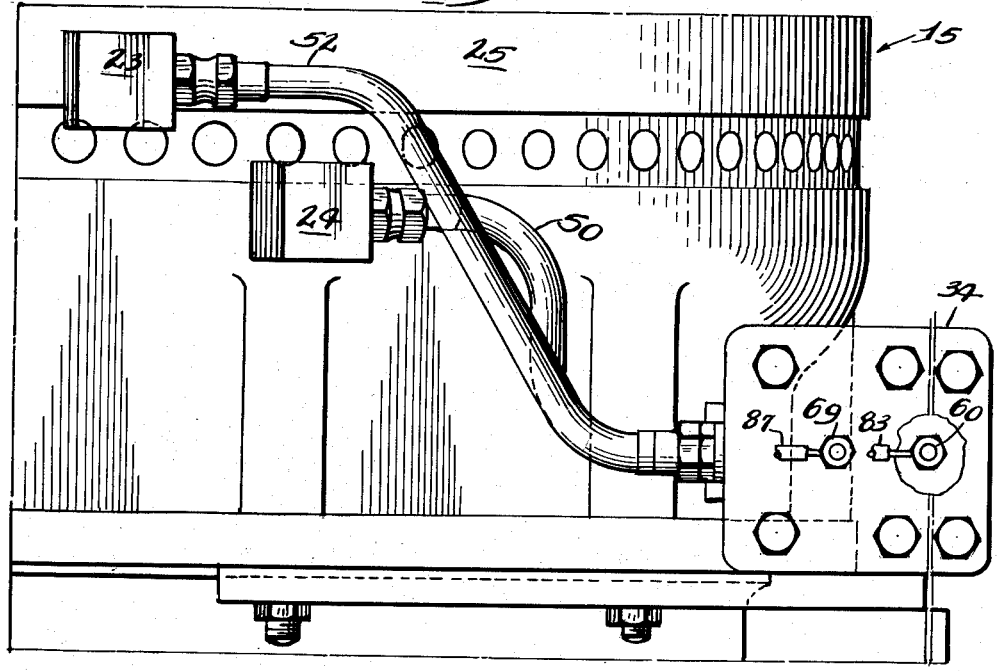

Jan. 8, 1963 C. R. HILPERT 3,071,922
TORQUE LIMITING DEVICE
Filed Dec. 14, 1959 7 Sheets-Sheet 4
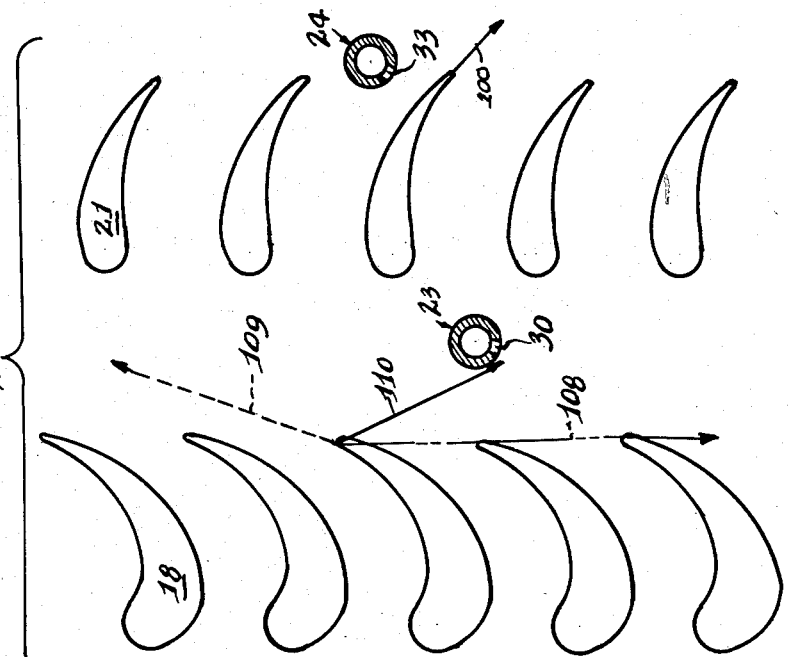
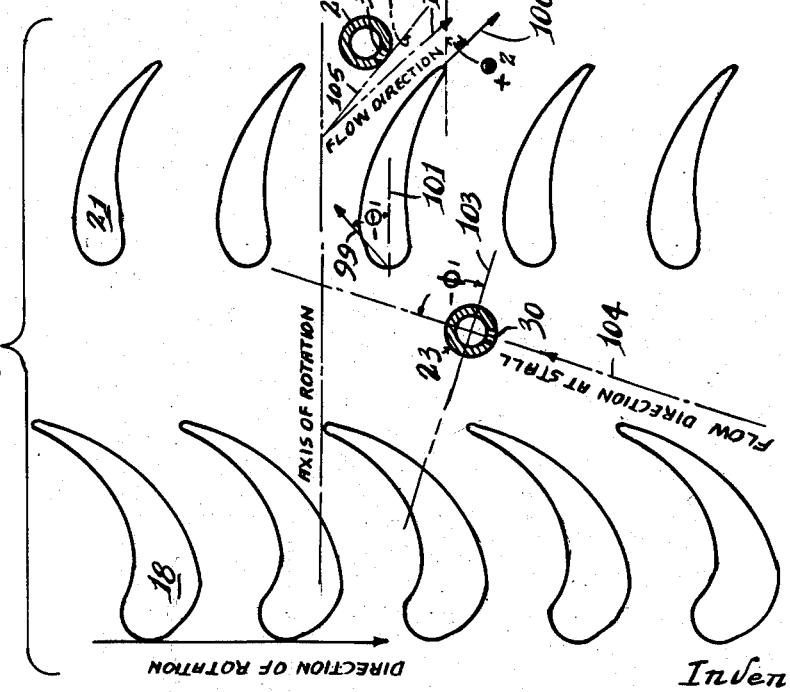
Inventor.
Conrad R. Hilpert.
By John W Dailey
Attorney

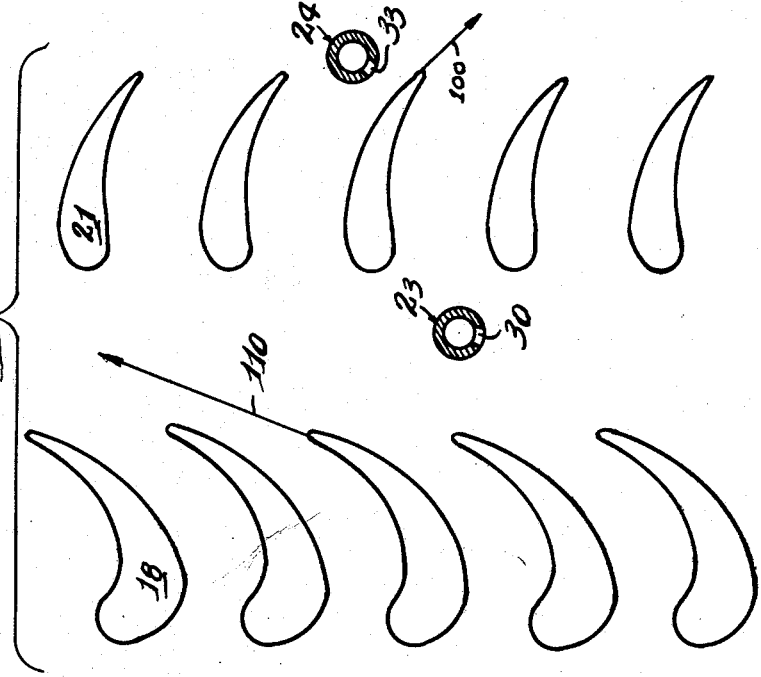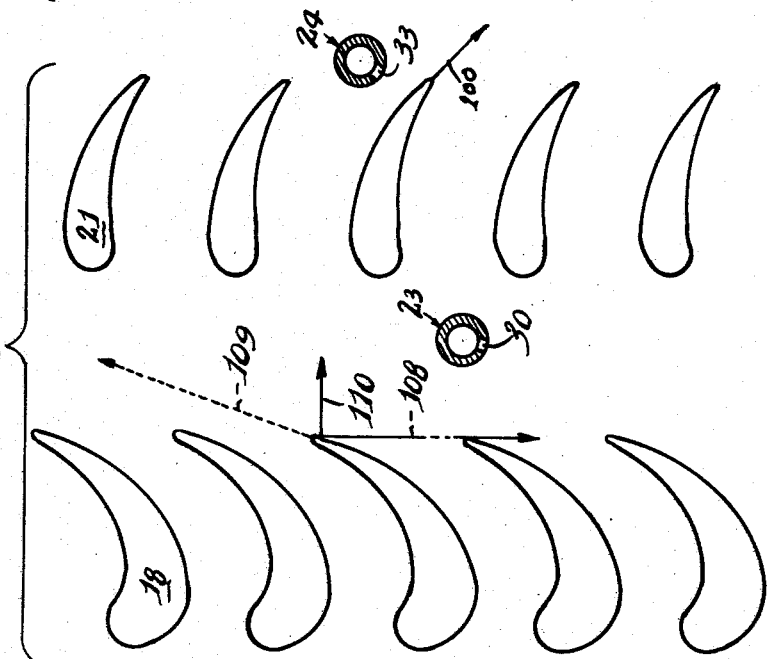

Jan. 8, 1963 C. R. HILPERT 3,071,922
TORQUE LIMITING DEVICE
Filed Dec. 14, 1959 7 Sheets-Sheet 6
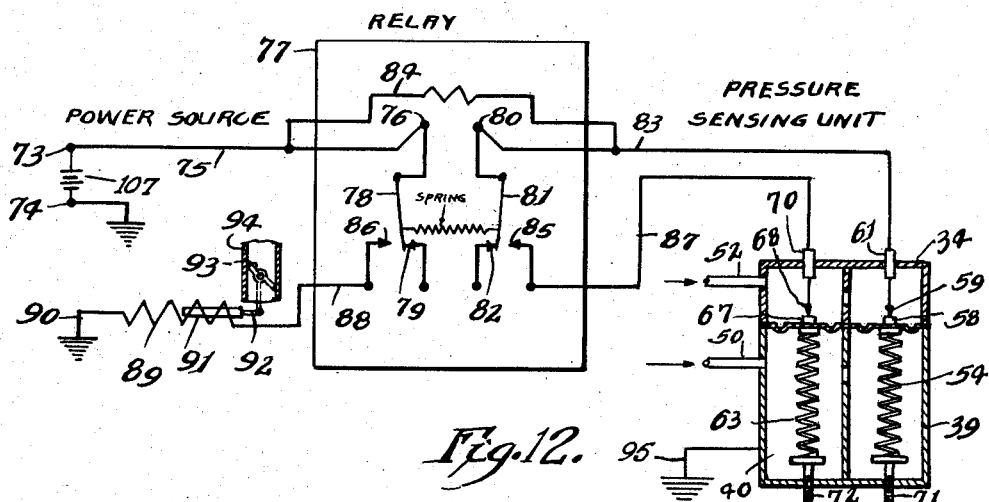
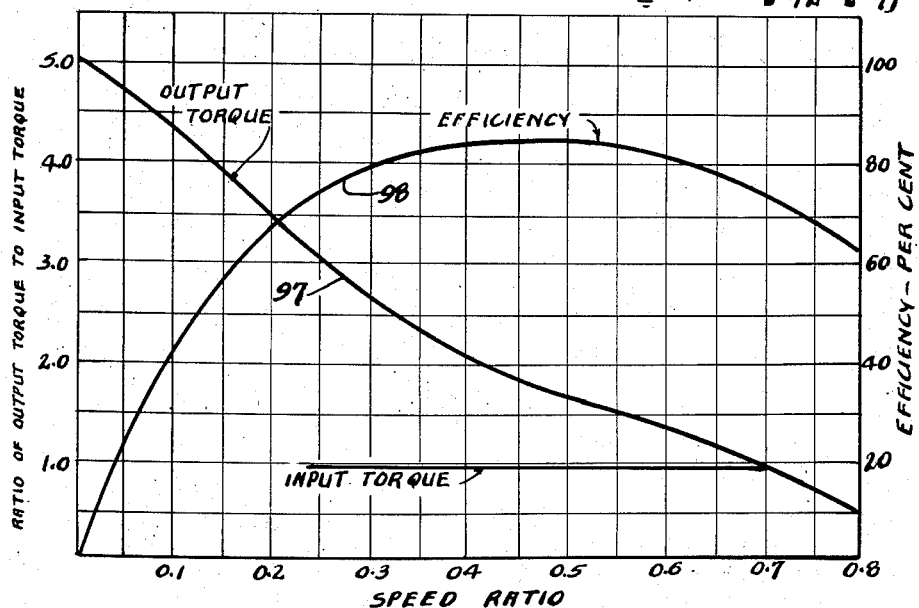
Inventor.
Conrad R. Hilpert.
By johnwoparley
Attorney.

Jan. 8, 1963 C. R. HILPERT 3,071,922
TORQUE LIMITING DEVICE
Filed Dec. 14, 1959 7 Sheets-Sheet 7

Inventor.
Conrad R. Hilpert.
By John O. Darley
Attorney.

United States Patent Office 3,071,922
Patented Jan. 8, 1963

3,071,922
TORQUE LIMITING DEVICE
Conrad R. Hilpert, Winnebago, Ill., assignor to Twin Disc Clutch Company, Racine, Wis., a corporation of Wisconsin
Filed Dec. 14, 1959, Ser. No. 859,194
9 Claims. (Cl. 60—12)

My invention relates to a torque limiting device for use with a stationary housing, hydraulic torque converter having any number of stages as a means for limiting the output torque thereof.

Hydraulic torque converters by reason of their exceptional torque multiplication and broad efficiency curve, especially those of the stationary housing type, are particularly useful in certain heavy duty servics, but in some instances, such as power shovels, for example, it is desirable to limit the output torque in accordance with a torque ratio of about 3:1 and to accomplish this result automatically as distinguished from dependence on operator control of the power source. By limiting the maximum output torque, it is possible to reduce overload on the driven machinery and to effect this at a favorable point on the efficiency curve to insure efficient operation of the power system, this is contradistinction to operation on the falling part of this curve in the direction of stall torque. Operation of the character contemplated by the use of the device disclosed herein is particularly helpful in power shovel work since it is possible to limit cable and boom loads during digging and hoisting and so increase the longevity of these items.

At the opposite or high speed end of the efficiency curve, an output shaft governor is normally employed during the so-called swing shift of the shovel to reduce the shovel speed when the power demand is low, but this invention is concerned only with a limitation on the output torque at some lower shaft speed and particularly at a desirable point on the efficiency curve.

It is therefore the principal object of the invention to provide a torque limiting device whose operation is based upon the known fixed relations between the hydrokinetics in the region of a stator of a stationary housing converter and the output torque, and between the output torque and impeller speed.

A further object is to provide a device as indicated which is tied in with the toroidal circuit of the converter by means of front and rear Pitot tubes respectively positioned at the inlet of a channel between one pair of stator blades and the outlet of another channel between another pair of such blades and which exhibit a differential pressure for effecting a control on the power source or the power input to the converter.

A further object is to provide a torque limiter as above set forth whose operation is characterized by precision and freedom from hunting at the control point.

In the drawings:

FIG. 2 is an enlarged, fragmentary section along the line 2—2 in FIG. 1.

FIG. 3 is a fragmentary plan view looking in the direction of the arrow 3 in FIG. 2.

FIG. 4 is an enlarged, sectional elevation of either Pitot tube, the front and rear tubes differing only in the positions of the inlet passages to the tubes.

FIGS. 5 and 6 are enlarged sections along the line 5—5 in FIG. 4 showing one suggestion for locating the inlet passage in each Pitot tube.

FIG. 7 is a schematic view showing one positioning of the front and rear Pitot tubes in relation to the blades of a stator and to the blades of a turbine immediately preceding in the toroidal circuit, and including the liquid inlet and exit angles to the stator blades and angular positionings of the Pitot tube inlet passages.

FIGS. 8 to 10, inclusive, are schematic views similar to FIG. 7 and vectorially showing under conditions of racing, maximum efficiency and stall, respectively, the working liquid flow in relation to the turbine and stator blades and the Pitot tubes.

FIG. 11 is a diagram of the electrical control circuit of the device.

FIG. 12 shows typical performance curves of a three-stage torque converter.

Figure 13:
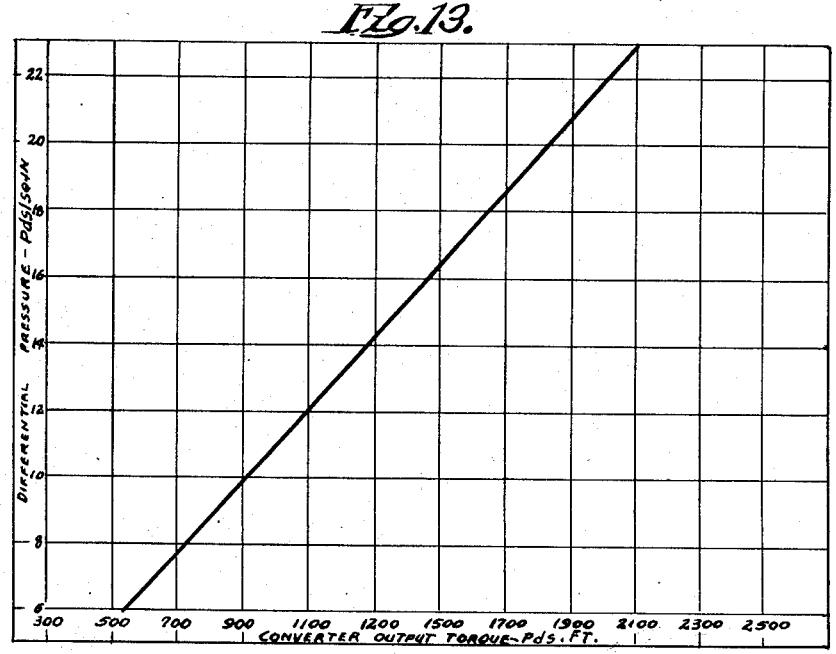

FIG. 13 shows the desired linear relation between the differential pressures exhibited by the Pitot tubes and the output torque and which is obtainable by a proper adjustment of the torque limiting device.

Figure 14:
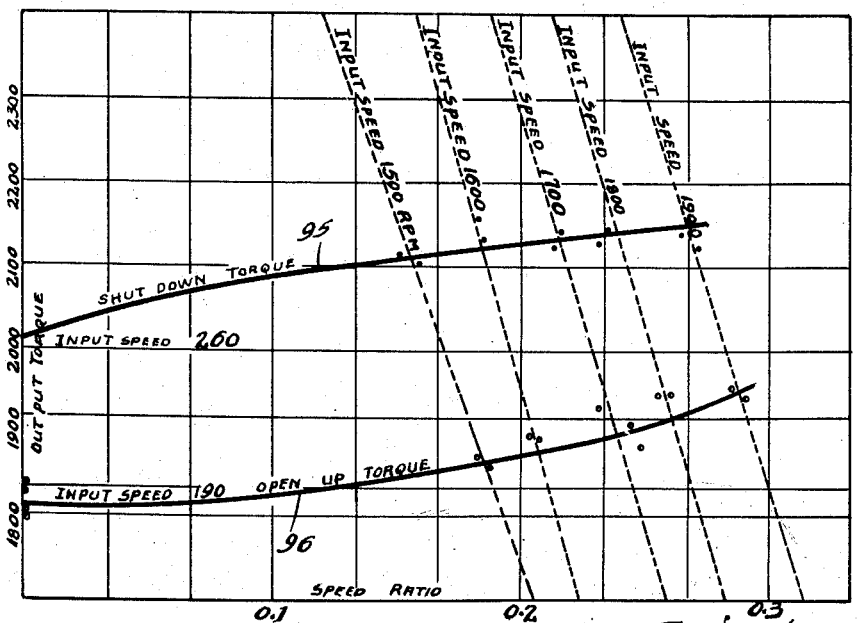

FIG. 14 shows typical curves, respectively, for shut down torque and open up torque indicating at various engine speeds that the engine speed will be decreased when the output torque exceeds the desired limit and that the engine will increase its speed when the equipment connected to the converter is unloaded.

Figure 1:
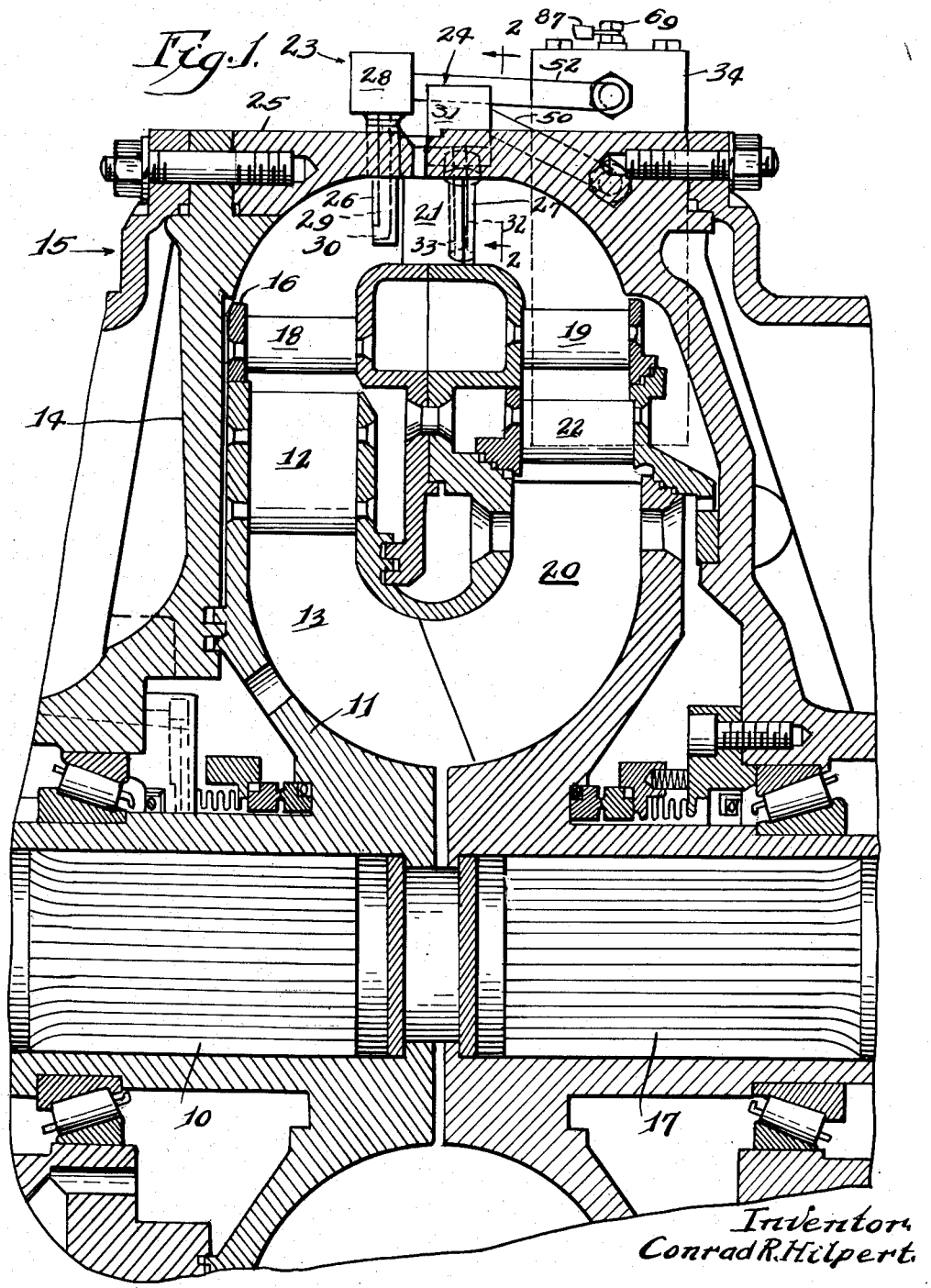
FIG. 1 is a fragmentary, sectional elevation of a three-stage, hydraulic torque converter showing the torque limiter applied thereto.

Referring to FIG. 1, the numeral 10 designates an input shaft having driven connection to a power souce which, by way of example, will be regarded as an internal combustion engine. The shaft 10 has splined, driving connection with an impeller 11 having the usual, annularly spaced, blades 12 bridged across the outward flow part of a toroidal circuit 13 which, in its outermost flow part is partially defined by a stationary housing 14 that surrounds all bladed parts of the converter 15. From the impeller blades 12, the working liquid flows through a three-stage turbine 16 connected to an output of load shaft 17 and which includes first, second and third stage, annularly spaced blades 18, 19 and 20, respectively. Between the turbine blades 18 and 19 are positioned first stator blades 21 and between the turbine blades 19 and 20 are positioned second stator blades 22, the stator blades 21 and 22 being suitably fixed to the housing 14 and annularly spaced in the usual manner.

For the particular converter 15 shown, the impeller and first stage turbine blades 12 and 18, respectively, are located in the outward flow part, the second stage turbine, second stator and third stage turbine blades 19, 22 and 20, respectively, are positioned generally in the inward flow part, and the first stator blades 21 are located in the outer U-bend, all with reference to the toroidal circuit 13. However, the invention, while shown in connection with a three-stage converter is not restricted to such a unit, but is generally concerned with application to a stationary housing converter having any number of stages.

As noted above, the operation of the torque limiter is based upon a recognition of the fixed relation between the kinetics of the working liquid in the region of the blades of a stator and the output torque of the associated converter. The velocity head of the working liquid varies with changes in the output torque and utilization of these pressure variations by means of a pressure sensing unit determines a reduction in the fuel supply to the engine, either by a direct connection to the engine throttle, fuel rack, or by changing the setting of a fuel control governor for an engine so equipped. Accordingly, when the torque output reaches a value which it is desired should not be exceeded, the power input to the converter is decreased.

Specifically, Pitot tubes 23 and 24 extend through the outer wall 25 of the converter housing 14 so that their stems 26 and 27, respectively, are positioned forwardly and rearwardly of the annulus of spaced, stator blades 21 considered with reference to the input and output ends of the converter 15. The tubes 23 and 24 will therefore be designated as front and rear and they reflect conventional design with the exception of different angular positionings of the inlet passages thereto which are exposed to the velocity head of the working liquid as will be presently described. This exception is dictated by the shape of the toroidal circuit in the locality of the first stator blades 21 and the shape and spacing of the latter.

Referring to FIGS. 4 and 5 which shows the internal arrangement of the front Pitot tube 23, the stem 26 is formed integrally with a hollow head 28 which is positioned externally of the converter housing wall 25. The stem 26 includes a longitudinal passage 29 providing connection between the interior of the head 28 and a laterally disposed inlet passage 30 whose entrance is exposed to the working liquid. The rear Pitot tube 24 is generally like the front tube 23 and also includes a hollow head 31 positioned externally of the housing wall 25 and integrally formed with the stem 27. The latter includes a longitudinal passage 32 providing connection between the interior of the head 31 and a laterally disposed inlet passage 33 (see FIG. 6) whose entrance is exposed to the working liquid.

As shown schematically in FIGS. 7 to 10, inclusive, the stem 26 is positioned forwardly of the channel entrance between one pair of first stator blades 21 with the inlet passage 30 facing towards the liquid issuing from the first turbine blades 18, while the stem 27 is located rearwardly of the channel exit between another pair of the first stator blades 21. In other words, the Pitot tubes 23 and 24 are annularly spaced a convenient distance, this being the preferred arrangement and the extent of the spacing will depend upon the converter design. The tube spacing insures that the pressures operative in each tube will truly reflect that established by the working liquid in each tube location as compared with placing the Pitot tubes 23 and 24 opposite the inlet and outlet, respectively, of the channel between one pair of first stator blades 21. The latter arrangement may result in a pressure transfer by the rear Pitot tube 24 which would not be the same as that existing at the channel exits between other pairs of first stator blades 21 due to turbulence set up the front Pitot tube 23.

The Pitot tubes 23 and 24 provide a means for establishing a differential pressure condition for determining the operation of a control circuit presently described, the pressure transferred by the Pitot tube 23 always being higher that that transferred by the rear tube 24 by reason of the "down stream" location of the latter. As a corollary of these respective, Pitot tube locations, it will be understood that the angular positions of the tube inlet passages 30 and 33 are also important. As shown in FIGS. 5 and 6, the passages 30 and 33 make different angles with the inner transverse diameter of the stems 26 and 27, respectively. These angles may vary for different converters and for any given converter are determined by experiment. Specifically, for the particular arrangement as shown in FIG. 7, the Pitot tube 23 through its stem 26 responds to the impact velocity of the oil ahead of the stator blades 21 while the Pitot tube 24 through its stem 27 and due to its position responds only to the static pressure of the oil leaving the stator blades 21. Angle values are chosen so that the differential pressure created by the pressures transferred by the Pitot tubes 23 and 24, which are handled so as to act in opposition, is a linear function of the output torque of the converter 15 as shown in FIG. 13.

It will be understood that the relation of the Pitot tubes 23 and 24 specifically to the first stator blades 21 is not restrictive. As far as functioning is concerned, they could be related to the second stator blades 22, the choice of the first stator blades for the particular FIG. 1 design being dictated by available space. Further, the first stator blades 21 in their relation to the Pitot tubes 23 and 24 are to be regarded as stator blades generally, this meaning that they may be considered as equivalent to the stator blades of a single stage converter and with which such blades the Pitot tubes 23 and 24 would be used, and generally to a ring of stator blades which are immediately preceded in the toroidal circuit by a ring of turbine blades.

Before describing the manner of utilizing the pressures transmitted by the Pitot tubes 23 and 24, consideration will be given to the flow conditions in the region of the stator and their relations to the output torque of the converter, such relations having heretofore been denoted as known and fixed. Obviously, this relation is not the same for all converters and since the operation of the torque limiting device for a particular converter depends upon its operating characteristics in the sense that the device is responsive to flow conditions over a limited speed ratio, such conditions must first be known and are determined by test. A further requirement is that the front Pitot tube 23 be located at the inlet of the ring of stator blades 21 which is immediately preceded in the toroidal circuit by the ring of turbine blades 18, or as may otherwise be expressed, the Pitot tube 23 is positioned at the outlet of the turbine blades 18, no other blading existing between the blades 18 and 21.

Fundamental in converter design are the following relations, namely, the output torque of the turbine is equal to the summation of the impeller input torque and the reaction toque of the stator; torque ratio is the ratio of output torque to input torque; speed ratio is the ratio of turbine speed to impeller speed; efficiency of the converter is the product of the torque and speed ratios; and that the torque produced by any ring of blades in the plane of rotation is the product of the force acting on such blades and the radius of the force, this radius being known in any given converter.

From the above relations, the following equations may be written in which the impeller, turbine and reaction torques are respectively denoted by $T_1$, $T_2$ and $T_s$, torque and speed ratios respectively by TR and SR, and efficiency by E; and impeller and turbine speeds of $N_1$ and $N_2$:

$$E = TR \times SR$$

$$= \frac{T_2}{T_1} \times \frac{N_2}{N_1}$$

and $$T_2 = T_1 + T_s$$

From these equations, with appropriate substitutions and transpositions is developed the following:

$$T_2 = T_s \left(1 - \frac{N_2}{N_1 E}\right)^{-1} \qquad (1)$$

Accordingly, the output torque is known if the stator torque and speed ratio are determined, efficiency being known from converter tests and is a fixed value for each speed ratio of a particular converter. Further, the above equations are true if a turbine immediately precedes the stator in the toroidal circuit.

The reaction torque is expressed as follows, $F_s$ and $r_s$ denoting respectively the liquid force acting on the stator and the force radius:

$$T_s = F_s r_s \qquad (2)$$

and by substituting this value of $T_s$ in Equation 1, the output torque is expressed in terms of the liquid force acting on the stator and factors which are known, including $r_s$, speed ratio and efficiency. Equation 1 then reads as follows:

$$T_2 = F_s r_s \left(1 - \frac{N_2}{N_1 E}\right)^{-1} \qquad (3)$$

The force $F_s$ acting on the stator depends on the angle of liquid flow and velocity of such flow and follows the impulse-momentum theory. Referring to FIG. 7, $\theta_1$ and $\theta_2$ designate the liquid inlet and outlet angles of the stator blades 21, these angles being measured between vectors 99 and 100 indicating the direction of liquid flow and lines 101 and 102 normal to the plane which includes the inlet edges of the stator blades 21, all respectively. Assuming that the inlet and outlet velocities of the liquid passing between the stator blades 21 are equal, this being a theoretical consideration, but close enough for present purpose and denoting such absolute velocity by V, liquid mass by M and time by $t$, the following equation holds:

$$F_s = \frac{M}{t}(V \sin \theta_1 + V \sin \theta_2) \quad (4)$$

Since the stator blades 21 are fixed under torque multiplying conditions which is the only consideration here, $\theta_2$ is constant and by measuring $\theta_1$ and V, the value of $F_s$ is readily determined.

The action of the Pitot tubes 23 and 24 is related to the foregoing in the following manner. For any Pitot tube submerged in and having its open end exposed to a flowing liquid, the total pressure just within the tube is the sum of the velocity and static pressures. In the present instance, denoting the total pressure within the tube 23, for example, as $P_s$, the static pressure in the same tube as $P_0$, and the density of the liquid by $\rho$, the following obtains:

$$P_s = \frac{V^2 \rho}{2} + P_0 \quad (5)$$

The factor $P_0$ also exists in the Pitot tube 24, but in view of the manner in which the tubes 23 and 24 are related to other parts of the device, the static pressures acting on these tubes are balanced so that the device is responsive only to the velocity pressures in the region of the stator. This aspect is important because, as far as effect on the control is concerned, irregularities in the static pressure, which otherwise might affect accuracy, are of no moment. Since $P_0$ is balanced out under the conditions indicated, Equation 5 then becomes $$P_s = \frac{V^2 \rho}{2} \quad (6)$$

Ideally and with respect to a flowing liquid, a Pitot tube is only responsive to that component of flow which is directly in line with the entrance to the tube, i.e., normal to the plane which includes such entrance. Again referring to FIG. 7, the angle $\phi_1$ for the tube 23 is zero when the liquid flow is in the plane of the Pitot tube entrance 30 and 90° when the flow is normal to such plane. In FIG. 7, the angle $\phi_1$ is 90° and indicates a stall condition of the turbine 18 and is measured between a line 103 included in the plane of the entrance 30 to the tube 23 and a line 104 indicating direction of turbine outflow at stall. With this consideration, Equation 6 becomes $$P_s = \frac{V^2 \rho}{2} \sin \phi_1 \quad (7)$$

Equation 4 above, when considered in connection with the fundamental relation of $$\frac{M}{t} = AV\rho$$

wherein A is the area of the liquid normal to the flow thereof may be rewritten as follows:

$$F_s = A\rho V^2 \sin \theta_1 + A\rho V^2 \sin \theta_2 \quad (8)$$

Since for any given stator, $\theta_2$ is constant, the force acting on the stator varies with $V^2$ and $\sin \theta_1$.

The right hand term of Equation 7 is similar to the first term in the summation of Equation 8 and the final term of the latter equation is $V^2$ times a constant. The Pitot tube 24 can be positioned to provide a pressure proportional to $V^2$ since it is at the outlet of the stator blades 21 where the direction of flow is constant. Still referring to FIG. 7, $\phi_2$ will be assigned to the angle through which the entrance 33 of the Pitot tube 24 is rotated from a true static pressure position, the angle $\phi_2$ being measured between a line 105 included in the plane of the entrance 33 and a line 106 indicating direction of the stator outlet flow. The following condition then obtains:

$$P_s = \frac{V^2 \rho}{2} \sin \phi_1 + \frac{V^2 \rho}{2} \sin \phi_2 \quad (9)$$

$\phi_2$ is set at a constant angle and since Equations 8 and 9 have the same form and if $\theta_1$ is made equal to $\phi_1$ and adjust $\phi_2$ so that it is equal to $\theta_2$, Equations 8 and 9 may be written thus, respectively, $$F_s = A\rho V^2 \sin \theta_1 + A\rho V^2 \sin \theta_2 \quad (10)$$

$$P_s = \frac{\rho V^2}{2} \sin \theta_1 + \frac{\rho V^2}{2} \sin \theta_2 \quad (11)$$

The ratio of $F_s$ to $P_s$ is then as follows:

$$\frac{F_s}{P_s} = \frac{A}{2} + \frac{A}{2} = A \quad (12)$$

and $$F_s = P_s A \quad (13)$$

so that the pressure $P_s$ from the Pitot tubes 23 and 24 is proportional to the force $F_s$ on the stator blades 21.

In limiting torque, the value $P_s$ is sensed by the Pitot tubes and Equation 3 has established that the output torque $T_2$ is equal to $F_s$ times the radius $r_s$ times a factor dependent on speed ratio which is $$\left(1 - \frac{N_2}{N_1 E}\right)^{-1}$$

If this factor were constant, $T_2$ would be directly proportional to $T_s$ (Equation 1) and to $F_s$ (Equation 3), but converter operation is such that this factor cannot be constant over the full speed ratio range and, for present purposes, it is not necessary that it should be. At low speed ratios, the efficiency is low and at zero speed ratio, the efficiency is zero. The important range is a limited one from zero speed ratio in the direction of increasing speed ratio (see FIG. 14) and if the efficiency increases linearly within this range from zero speed ratio, the above factor remains constant for that range, this factor being that in parentheses in Equation 1. Hence, for this range, $T_2$ is directly proportional to $F_s$ and $P_s$.

To utilize the pressures transmitted by the front and rear Pitot tubes 23 and 24, respectively, a pressure sensing unit, generally indicated by the numeral 34 in FIG. 2, is employed. This device includes a casing 35 suitably carried by a bracket 36 attached to the converter housing 14. The bottom of the casing 35 is closed by a plate 37 from which extends upwardly a wall 38 which divides the interior of the casing 35 into chambers 39 and 40 which are in constant communication through a passage 41 in the wall 38 so that the pressures in these chambers are always equal and active against the under sides of diaphragms 42 and 43, respectively, at the upper ends of the chambers.

The diaphragms are sealably clamped against the upper edge faces of the casing 35 and dividing wall 38 by a cover 45. The latter is shaped to provide chambers 46 and 47 defined by the diaphragm 42 and 43, respectively, and the cover 45 and these chambers are in constant communication through a passage 48 in the cover 45 so that the pressures in the chambers 46 and 47 are always equal and active against the upper sides of the diaphragms 42 and 43, respectively. The chamber 40 constantly communicates through a passage 49 in the wall of the casing 35 and a connecting pipe 50 with the hollow head 31 of the rear Pitot tube 24 while the chamber 47 constantly communicates through a passage 51 in the cover 45 and a connecting pipe 52 with the hollow head 28 of the front Pitot tube 23. Hence, at any speed of the impeller 11, the pressure in the chambers 46 and 47 will be that dictated by the front Pitot tube 23 while the pressure in while the pressure in the chambers 39 and 40 will be that dictated by the rear Pitot tube 24, the latter pressure being always lower than the former. The basic static converter pressure transmitted through the Pitot tubes 23 and 24 to opposite sides of the diaphragms 42 and 43, respectively, are balanced and cancelled as far as operation of the device is concerned.

For reasons presently explained, the diaphragms 42 and 43 are loaded in one direction to different values by means independent of the pressures normally acting there-against. For the diaphragm 42, a follower 53 is sealably slidable in lower part of the chamber 39 and seated thereon is the lower end of a helical spring 54 whose upper end bears against a retainer 55 which overlies the central part of the diaphragm 42 that is clamped therebetween and a cup 56 by means of a cap screw 57 whose head 58 is disposed above the diaphragm 42, serves as an electrical contact and will be so denoted hereinafter. In the relation shown in FIG. 2, the contact 58 engages a contact 59 provided by the head of a screw 60 that extends upwardly through the cover 45 in spaced relation thereto and externally of the cover for fastening to a wire presently described. Further insulation for the screw 60 is provided by a sleeve 61 composed of appropriate material which surrounds the screw 60 between the contact 59 and the upper part of the chamber 46.

For the diaphragm 43, a follower 62 is sealably slidable in the lower part of the chamber 40 and seated thereon is the lower end of a helical spring 63 whose upper end abuts a retainer 64 between which and a cup 65 the central portion of the diaphragm 43 is clamped by a cap screw 66 whose head 67 is positioned above this diaphragm, functions as an electrical contact and will be so referred to hereinafter. In the closed position shown in FIG. 2, the contact 67 engages a contact 68 provided by the head of a screw 69 that extends upwardly through the cover for fastening to a wire presently described. Additional insulation for the screw 69 is furnished by a sleeve 70 composed of suitable material which surrounds the screw 69 between the contact 68 and the upper part of the chamber 47.

So far as described, it will be apparent that as the output torque of the converter 15 varies, there will be corresponding variations in the pressure that is common to the chambers 46 and 47, and in the pressure that is common to the chambers 39 and 40. For purpose of control as presently explained, the springs 54 and 63 are loaded to different values by adjusting screws 71 and 72 which are threaded through the bottom plate for engagement with the followers 53 and 62, all respectively. The spring 63 is loaded to a higher value than the spring 54, the precise amount depending on the converter design and the nature of its load. In any event, however, the loading difference is such that, in the direction of increasing torque and therefore higher pressure differential between the chambers 46 and 47, and the chambers 39 and 40, the contacts 58 and 59 will separate close to the control point before the contacts 67 and 68, while in the direction of decreasing torque, the contacts 67 and 68, due to the higher loading of the spring 63, will engage before the contacts 58 and 59. These characteristics of the pressure sensing unit 34 are availed of as a means for determining the operation of an electrical circuit which is tied in with the fuel supply to the engine, whether throttle or governor setting. This circuit will now be described, reference being to FIG. 11.

The electric circuit is preferably connected to a direct current source 107 through hot and ground terminals 73 and 74, respectively. A hot wire 75 connects the terminal 73 with a terminal 76 forming part of a relay 77 and which connects with a switch 78 that is suitably biased to open position in engagement with a ground terminal 79. The relay 77 also includes a terminal 80 which connects with a switch 81 that is biased to open position in engagement with a ground contact 82 and also connects by a wire 83 with the contact 59. Bridged around the terminals 76 and 80 and also forming a part of the relay 77 is a coil 84 whose opposite ends respectively connect with the wires 75 and 83 and whose energization determines the closing of the switches 78 and 81.

When the coil 84 is energized, the switches 78 and 81 are simultaneously moved to respectively engage the contacts 86 and 85. The contact 85 connects by a wire 87 with the contact 68, while the contact 86 connects by a wire 88 with one end of a solenoid 89 whose opposite end is grounded at 90. The solenoid core 91 connects by suitable linkage 92 with a throttle valve 93 mounted in the usual intake manifold 94 of an internal combustion engine. The arrangement is such that when the solenoid 89 is energized, the core 91 will shift to the left and rock the throttle valve 94 from the idling position shown in FIG. 11 to a full open position. The throttle valve 93 is intended to generically represent a control on the engine fuel supply and hence equivalent to a governor fuel setting control and the solenoid 89 also generally represents a control on an electrical power source such as a motor including those of the electrical type. Further, it will be understood that, when the relay coil 84 is energized, the circuit is completed through the pressure sensing unit 34 whose casing is grounded at 95.

With the engine not running, the converter 15 therefore not operating, and the terminals 73 and 74 disconnected from the electric power source, the several parts of the device occupy the positions shown in FIG. 11. When the engine-converter unit is placed in operation and the terminals 73 and 74 are connected to the electric power source, the relay coil 84 is energized to thereby effect closing movements of the switches 78 and 81. The hot terminal 73 then connects through the wire 75, relay coil 84 and wire 83 with the contact 59, and also through the wire 75, relay coil 84, wire 83, terminal 80, switch 81, contact 85 and wire 87 with the contact 68. Also, the hot terminal 73 connects through wire 75, terminal 76, switch 78, contact 86 and wire 88 with the solenoid 89 whose energization opens the throttle valve 93. This condition continues as long as the output torque is below the limit set by the device of this application and also under the same condition, the contacts 58 and 59 (see FIG. 2), and the contacts 67 and 68, respectively, remain in engagement since the pressures in the communicating chambers 39 and 40, and 46 and 47, are not relatively such as to effect separation of these contacts.

As the converter output torque reaches and tends to exceed the predetermined limit, the following sequence of events occurs. As noted above, the pressure supplied through the pipe 52 is always higher than that through the pipe 50 and with an increase in output torque of the converter 15, these pressures also increase. As this torque tends to exceed the desired limit, the contact 58 separates intermittently from the contact 59 while the contacts 67 and 68 remain in engagement by reason of the higher loading of the spring 63 relative to the spring 54. This intermittent breaking of the contacts 58 and 59 is due to the at times fluctuating nature of the pressures supplied through the pipes 50 and 52. Expressed in other words, there is a steady or base pressure which is overlaid by a smaller fluctuating pressure or ripple that may be as much as 10% of the total.

The intermittent breaks of the contacts 58 and 59 does not disturb the energization of the relay coil 84 as maintained by the continued engagement of the contacts 67 and 68 and the circuit including the wire 83, terminal 80, switch 81, contact 85 and wire 87 leading to the contact 68, the arrangement acting as a holding circuit. When the contacts 58 and 59 are fully opened, the pressures in the respective chambers of the sensing unit 34 have reached relative values such that the contacts 67 and 68 separate instantly, the relay coil 84 is deenergized, the switches 78 and 81 are returned to the open positions shown in FIG. 11, the solenoid 89 is deenergized and the fuel supply to the engine is reduced.

Therefore, the output torque of the converter 15 begins to decrease and this is reflected in decreasing pressures operating through the pipes 50 and 52 and these pressures are also of a fluctuating nature. When the pressures have relatively decreased a sufficient amount, the contacts 67 and 68 engage first because of the higher loading of the spring 63 and this engagement may be intermittent or firm dependent upon the relation of the steady to the fluctuating or ripple pressure. With continued output torque and pressure reduction, the contacts 58 and 59 engage to restore the FIGS. 11 circuit to operating condition and the engine to full power supply.

The purpose of the two sets of contacts 58 and 59, and 67 and 68, respectively, is to eliminate hunting and to insure under precise conditions a reduction in input torque to the converter whenever the latter's output torque tends to exceed the determined limit. An instantaneous break of the contacts 67 and 68 in the direction of increasing torque effects a snap conditioning of the device to limit the output torque, while an instantaneous make of the contacts 58 and 59 in the direction of decreasing torque effects a snap conditioning of the device for operation in the non-limiting range. In FIGS. 8, 9 and 10 are schematically shown the turbine blades 18, stator blades 21 and Pitot tubes 23 and 24 and vectorially the velocities of the liquid and turbine blades under conditions of racing ($T_2=0$), peak performance ($E=$max.), and stall ($N_2=0$), respectively. The numerals 108, 109 and 110, where appropriate in FIGS. 8, 9 and 10, respectively denote the velocity of the turbine blades 18, the velocity of the liquid relative to the turbine blades 18, and the absolute liquid velocity, the latter being the factor which the Pitot tubes "see."

In FIG. 14 are shown characteristic curves for shut down torque 95 and open up torque 96 or resumption of operating power flow through the converter in relation to several input speeds. Positions along the shut down curve 95 for any given input speed represents conditions at which the power output of the engine is reduced by control on its fuel supply, and when the operator unloads the connected machine for operation on the curve 96, assumed in the present instance to be a power shovel, the engine will return to full power.

The numerical values of the high and low, differential pressures which determine deenergization and energization, respectively, of the FIG. 11 circuit will vary with different operating conditions, such as, for example, the size of the converter, the engine horsepower, and the limit selection of the output torque. The differences in the loadings of the springs 54 and 63 will also vary with operating conditions and will in general depend on whatever spacing is desired to compensate for the effect of that pressure which surges relative to the steady or basic pressure in the converter. In one installation, the loading of the springs 54 and 63 varied by about 10%, but this value is not restrictive, the primary requirement being that the spring 63 is always loaded to a higher value than the spring 54.

Reference to FIG. 12 shows the advantages accruing from the use of the torque limiter disclosed herein, the numerals 97 and 98 designating, respectively, the output torque and efficiency curves of a typical three-stage, hydraulic torque converter. Considering a converter coupled to a power shovel and not provided with a torque limiter, it will be apparent that as the output torque rises and approaches stall torque, operation in this area is on the falling side of the efficiency curve 98. The shovel would seem to dig deeper but at the expense of its useful life since it would be operating in inefficient ranges. It has been ascertained that the operator cannot be relied upon to correct this situation. By using the torque limiter, however, and assuming by way of example, an output torque cutoff at 3:1 torque ratio, operation of the shovel will be on the best portion of the efficiency curve 98 of the converter and overloading of the shovel, its boom and cables is prevented.

I claim:

1. A device for limiting the output torque of a stationary housing hydraulic torque converter over a predetermined range of speed ratios from stall, the converter having a toroidal circuit filled with a liquid at a basic static pressure and in which circuit are positioned an impeller connected to a power source, a turbine and a stator immediately following the turbine in the direction of flow, first and second Pitot tubes extending into the toroidal circuit adjacent, respectively, the inlet and outlet of the stator and constantly subjected to the static pressure, the first tube being additionally subjected to at least a component of the velocity pressure of the liquid discharged by the turbine and the second Pitot tube being subjected to velocity pressure of the liquid discharged by the stator within a pressure range from zero to less than the velocity pressure in the first Pitot tube, the total pressure transmitted by the first Pitot tube being always higher than that by the second tube, and pressure sensing means including chambers respectively communicating with the first and second Pitot tubes and equal area diaphragm means separating the chambers and deflectible by a predetermined difference in the chambers' pressures, and means responsive to said deflection and operably connected to the power source for reducing the power input to the impeller.

2. A device as defined in claim 1 wherein the means responsive to said deflection is provided by an electric circuit including a pair of contacts, one carried by the sensing means and the other carried by the diaphragm means, a relay having a switch and a coil energized to close the switch when the contacts are in engagement below a predetermined output torque of the converter, and a solenoid having a core operably connected to the power source and shiftable respectively between positions increasing the power input to the impeller when the solenoid is energized by closure of the switch and reducing the power input to the impeller when the solenoid is deenergized by opening of the switch at said predetermined output torque.

3. A device as defined in claim 1 wherein the chambers are separated by first and second, independently flexed diaphragms, springs respectively loading the diaphragms to relatively high and low values whereby the low loaded diaphragm deflects before the high loaded diaphragm as the converter output torque approaches a predetermined value, and the means which is responsive to the deflection of the high loaded diaphragm is operably connected to the power source for reducing power input to the impeller.

4. A device as defined in claim 3 wherein the means responsive to said deflection is provided by an electric circuit including first and second pairs of contacts, one contact in each pair being carried by the pressure sensing means and the other contact in each pair being respectively carried by the low and high loaded diaphragms, a relay having first and second switches and a coil energized to close the switches when the first and second pairs of contacts are in engagement below a predetermined output torque of the converter, the first switch when closed being in series with the pair of contacts associated with the high loaded diaphragm and in parallel with the connection of the relay coil to the contacts associated with the low loaded diaphragm, and a solenoid having a core operably connected to the power source and shiftable respectively between positions increasing the power input to the impeller when the solenoid is energized by closure of the second switch and reducing the power input to the impeller when the solenoid is deenergized by opening of the first switch at said predetermined output torque.

5. The combination of an hydraulic torque converter having a stationary housing enclosing a toroidal circuit filled with a liquid at a basic static pressure and in which circuit are positioned an impeller connected to a power source, a turbine and a stator immediately following the turbine in the direction of flow, first and second Pitot tubes extending into the toroidal circuit adjacent, respectively, the inlet and outlet of the stator and constantly subjected to the static pressure, the first tube being additionally subjected to at least a component of the velocity pressure of the liquid discharged by the turbine and the second Pitot tube being subjected to velocity pressure of the liquid discharged by the stator within a pressure range from zero to less than the velocity pressure in the first Pitot tube, the total pressure transmitted by the first Pitot tube being always higher than that by the second Pitot tube, sensing means having a movable part provided with first and second opposed surfaces of equal area exposed to the pressures respectively transmitted by the first and second Pitot tubes, and means responsive to a predetermined movement of the part occasioned by a determined differential in the pressures transmitted by the tubes and operably connected to the power source for reducing the power input to the impeller.

6. The combination as defined in claim 5 wherein the sensing means includes chambers, respectively communicating with the first and second Pitot tubes and the movabel part is provided by equal area diaphragm means separating the chambers and deflectible by a predetermined difference in the chambers' pressures.

7. The combination as defined in claim 6 wherein the means responsive to said deflection is provided by an electric circuit including a pair of contacts, one carried by the sensing means and the other carried by the diaphragm means, a relay having a switch and a coil energized to close the switch when the contacts are in engagement below a predetermined output torque of the converter, and a solenoid having a core operably connected to the power source and shiftable respectively between positions increasing the power input to the impeller when the solenoid is energized by closure of the switch and reducing the power input to the impeller when the solenoid is deenergized by opening of the switch at said predetermined output torque.

8. The combination as defined in claim 1 wherein the chambers are separated by first and second, independently flexed diaphragms, springs respectively loading the diaphragms to relatively high and low values whereby the low loaded diaphragm deflects before the high loaded diaphragm as the converter output torque approached a predetermined value and the means which is responsive to the deflection of the high loaded diaphragm is operably connected to the power source for reducing power input to the impeller.

9. The combination as defined in claim 8 wherein the means responsive to said deflection is provided by an electric circuit including first and second pairs of contacts, one contact in each pair being carried by the pressure sensing means and the other contact in each pair being respectively carried by the low and high loaded diaphragms, a relay having first and second switches and a coil energized to close the switches when the first and second pairs of contacts are in engagement below a predetermined output torque of the converter, the first switch when closed being in series with the pair of contacts associated with the high loaded diaphragm and in parallel with the connection of the relay coil to the contacts associated with the low loaded diaphragm, and a solenoid having a core operably connected to the power source and shiftable respectively between positions increasing the power input to the impeller when the solenoid is energized by closure of the second switch and reducing the power input to the impeller when the solenoid is deenergized by opening of the first switch at said predetermined output torque.

References Cited in the file of this patent

UNITED STATES PATENTS

| | | |
|---|---|---|
| 1,868,130 | Bauer et al. | July 19, 1932 |
| 2,603,943 | Evernden | July 22, 1952 |
| 2,721,072 | Zuhn et al. | Oct. 18, 1955 |
| 2,924,941 | Snoy | Feb. 16, 1960 |
| 2,933,236 | Mathieson | Apr. 19, 1960 |

FOREIGN PATENTS

| | | |
|---|---|---|
| 439,096 | Germany | Jan. 3, 1927 |